(12) United States Patent
Wang et al.

(10) Patent No.: US 11,868,297 B2
(45) Date of Patent: Jan. 9, 2024

(54) FAR-END DATA MIGRATION DEVICE AND METHOD BASED ON FPGA CLOUD PLATFORM

(71) Applicant: INSPUR SUZHOU INTELLIGENT TECHNOLOGY CO., LTD., Jiangsu (CN)

(72) Inventors: Jiangwei Wang, Jiangsu (CN); Rui Hao, Jiangsu (CN); Hongwei Kan, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/792,265

(22) PCT Filed: Aug. 25, 2020

(86) PCT No.: PCT/CN2020/111006
§ 371 (c)(1),
(2) Date: Jul. 12, 2022

(87) PCT Pub. No.: WO2021/143135
PCT Pub. Date: Jul. 22, 2021

(65) Prior Publication Data
US 2023/0045601 A1 Feb. 9, 2023

(30) Foreign Application Priority Data
Jan. 13, 2020 (CN) .......................... 202010031268.7

(51) Int. Cl.
*G06F 13/40* (2006.01)
*G06F 15/173* (2006.01)
*H04L 67/1097* (2022.01)

(52) U.S. Cl.
CPC .... *G06F 13/4022* (2013.01); *G06F 15/17331* (2013.01); *H04L 67/1097* (2013.01); *G06F 2213/0026* (2013.01)

(58) Field of Classification Search
None
See application file for complete search history.

(56) References Cited

U.S. PATENT DOCUMENTS 10,169,065 B1 * 1/2019 Nye .................... G06F 9/5088
2019/0079897 A1 3/2019 Kochevar-cureton et al.
(Continued)

FOREIGN PATENT DOCUMENTS

| CN | 103002046 A | 3/2013 |
|---|---|---|
| CN | 103647807 A | 3/2014 |

(Continued)

OTHER PUBLICATIONS

International Search Report and English Translation cited in PCT/CN2020/111006 dated Nov. 13, 2020, 7 pages.
(Continued)

*Primary Examiner* — Idriss N Alrobaye
*Assistant Examiner* — Dayton Lewis-Taylor
(74) *Attorney, Agent, or Firm* — Cooper Legal Group LLC

(57) ABSTRACT

A far-end data migration device and method based on a FPGA cloud platform. The device includes a server, a switch, and a plurality of FPGA acceleration cards. The server transmits data to be accelerated to the FPGA acceleration cards by means of the switch. The FPGA acceleration cards are configured to perform a primary and/or secondary acceleration on the data, and are configured to migrate the accelerated data. The method includes: transmitting data to be accelerated to a FPGA acceleration card from a server by means of a switch; performing, by the (Continued)

FPGA acceleration card, a primary and/or secondary acceleration on the data to be accelerated; and migrating, by the FPGA acceleration card, the accelerated data.

17 Claims, 3 Drawing Sheets

(56) References Cited

U.S. PATENT DOCUMENTS

| | | | |
|---|---|---|---|
| 2019/0205745 A1* | 7/2019 | Sridharan | ............. G06F 9/5061 |
| 2019/0372914 A1 | 12/2019 | Ganguli et al. | |

FOREIGN PATENT DOCUMENTS

| | | | |
|---|---|---|---|
| CN | 105183683 A | 12/2015 |
| CN | 106250349 A | 12/2016 |
| CN | 106547720 A | 3/2017 |
| CN | 106681793 A | 5/2017 |
| CN | 106778015 A | 5/2017 |
| CN | 107750357 A | 3/2018 |
| CN | 109032982 A | 12/2018 |
| CN | 109857620 A | 6/2019 |
| CN | 109992405 A | 7/2019 |
| CN | 110399719 A | 11/2019 |
| CN | 110519090 A | 11/2019 |
| CN | 110618956 A | 12/2019 |
| CN | 110622145 A | 12/2019 |
| CN | 110647480 A | 1/2020 |
| WO | 2019165355 A1 | 8/2019 |

OTHER PUBLICATIONS

Written Opinion and English Translation cited in PCT/CN2020/111006 dated Nov. 13, 2020, 8 pages.
First Office Action cited in CN202010031268.7 dated Mar. 12, 2021, 14 pages.
Second Office Action cited in CN202010031268.7 dated Nov. 4, 2021, 14 pages.
"3GPP Communication Data Compression Research Based on the Preprocessing Method", Nov. 15, 2014, 63 pages.
Ammendola, et al., "Virtual-to-Physical Address Translation for an FPGA-based Interconnect with Host and GPU Remote DMA Capabilities", 2013 International Conference on Field-ProgrammableTechnology (FPT), Jan, 23, 2014, 8 pages.
Caulfield, et al., "A Cloud-Scale Acceleration Architecture", 2016 49th Annual IEEE/ACM International Symposium on Microarchitecture (MICRO), Dec. 15, 2016, 13 pages.
Li, Bojie, "High Performance Data Center Systems with Programmable Network Interface Cards" Aug. 15, 2019.

* cited by examiner

FAR-END DATA MIGRATION DEVICE AND METHOD BASED ON FPGA CLOUD PLATFORM

This application claims priority to Chinese Patent Application No. 202010031268.7, filed on Jan. 13, 2020, in China National Intellectual Property Administration and entitled "Far-End Data Migration Device and Method Based on FPGA Cloud Platform", the contents of which are hereby incorporated by reference in its entirety.

FIELD

The present disclosure relates to the technical field of Field Programmable Gate Array (FPGA)-based data migration applications, and particularly to a far-end data migration device and method based on a FPGA cloud platform.

BACKGROUND

Cloud computing is an Internet-based computing mode. In this mode, shared hardware and software resources and information may be provided for computers and other devices as needed. Data grows in a cloud by about 30% per year, and meanwhile, rapid development of Artificial Intelligence (AI) also makes requirements for high-performance data computing. As a result, a conventional Central Processing Unit (CPU) is unable to solve problems about computing performance. A FPGA is configured for computing acceleration in a data center by virtue of its advantages of high performance, low latency, flexible extensibility, low power consumption, etc. Currently, Microsoft, Amazon, Baidu, Tencent, Alibaba, and other data centers have all launched FPGA cloud platforms to implement computing acceleration by taking FPGAs as sharable resources in clouds. Multiple FPGA accelerator units may form a computing resource pool through a network, thereby implementing distributed data acceleration. The key to the implementation of a distributed FPGA cloud platform is how to implement data migration in different FPGA accelerator units and improve the data migration efficiency.

FIG. 1 is a schematic diagram of a network topology of an existing FPGA cloud platform. FPGA boards are connected to a switch through Media Access Control (MAC) network interfaces to form a FPGA resource pool. The FPGA board may be in the form of a Peripheral Component Interconnect Express (PCIE) acceleration card in a server, or multiple independent FPGA boards in a Just a Bunch Of FPGAs (JBOF, a FPGA pool including FPGA acceleration cards only). The FPGA cloud platform is generally configured to accelerate an algorithm with a quite large amount of data computation, such as an AI algorithm, picture processing, and gene sequencing. Multiple FPGA boards are needed to accelerate an algorithm cooperatively by data interaction between the multiple FPGA boards.

A Remote Direct Memory Access (RDMA) technology is a modern high-performance network communication technology based on hardware acceleration. RDMA over Converged Ethernet (RoCE), a technology commonly used for FPGA clouds currently, defines how to implement RDMA over the Ethernet. RoCE directly transmits data from a memory of a computer to another computer without interventions of operating systems of both sides. FIG. 2 is a schematic diagram of functions of an existing RDMA technology. When a server A transmits data to a server B, an application of the server A executes an RDMA write request, and without the participation of a kernel memory, the RDMA write request is sent from the application running in a user space to a cache Memory of a FPGA board A with a RDMA function. The FPGA board A reads the data in the cache Memory, and transmits the data to a cache Memory of a FPGA board B through a network. Then, the FPGA board B directly writes the data to an application cache of the server B.

A RDMA protocol standard is set by the InfiniBand Trade Association (IBTA, the setter of the Infiniband standard) to implement data transmission between endpoints. A FPGA needs to follow the RDMA protocol standard to realize a RDMA function, which makes it relatively complex to realize the function and occupies many FPGA resources. In addition, the RDMA standard defines a protocol standard for data transmission between two hosts, but does not define any protocol standard for data transmission between FPGA boards in a JBOF topology, and it is necessary to seek for a method suitable for data migration between FPGA boards in a JBOF topology.

SUMMARY

Embodiments of the present disclosure provide a far-end data migration device and method based on a FPGA cloud platform, so as to solve the problem of data acceleration and migration between FPGA boards in a JBOF topology under a FPGA cloud platform.

The embodiments of the present disclosure disclose the following technical solutions.

A first aspect of the present disclosure provides a far-end data migration device based on a FPGA cloud platform, including a server, a switch, and FPGA acceleration cards. The device includes a plurality of FPGA acceleration cards. The server transmits data to be accelerated to the plurality of FPGA acceleration cards by means of the switch. The plurality of FPGA acceleration cards are configured to perform a primary and/or secondary acceleration on the data, and are configured to migrate the accelerated data.

Further, the FPGA acceleration card includes a SHELL and a FPGA Accelerator Unit (FAU). The SHELL is configured as an interface connection between the FPGA acceleration card and the switch. The SHELL is configured to migrate data on the FPGA acceleration card. The FAU is configured to perform the primary and/or secondary acceleration on the data on the FPGA acceleration card.

Further, the SHELL includes an iRDMA, a Memory, a PCIE, and a MAC. The Memory is connected with the iRDMA. The iRDMA is connected with the PCIE and the MAC. In response to the Memory on the FPGA acceleration card being accelerated by the FAU, the iRDMA is configured to implement data migration between the Memory and FAU on the FPGA acceleration card. In response to the data being migrated on the plurality of FPGA acceleration cards, the iRDMA implements data migration between Memories on the plurality of FPGA acceleration cards through MAC interfaces.

Further, an acceleration algorithm of the FAU includes LZ77 and Huffman. The LZ77 acceleration algorithm performs a first-stage compression on the data on the FPGA acceleration card to implement a primary data acceleration. The Huffman acceleration algorithm performs a second-stage compression on primarily accelerated data on the FPGA acceleration card to implement a secondary data acceleration.

Further, the iRDMA includes a bridge module Bridge, a message processing module pkt_pro, and a parsing module fau_parse. The message processing module pkt_pro parses and encapsulates a data migration read/write instruction message received by a PCIE interface or the MAC interface. The parsing module fau_parse is configured to parse a data migration read instruction message initiated by the FAU. The bridge module Bridge is configured to convert migration instructions parsed by the bridge module Bridge and the message processing module pkt_pro into timing of reading/writing the Memory interface.

A second aspect of the present disclosure provides a far-end data migration method based on a FPGA cloud platform, including:

transmitting data to be accelerated to a FPGA acceleration card from a server by means of a switch;

performing, by the FPGA acceleration card, a primary and/or secondary acceleration on the data to be accelerated; and migrating, by the FPGA acceleration card, the accelerated data.

Further, the step of performing, by the FPGA acceleration card, the primary and/or secondary acceleration on the data to be accelerated specifically includes:

performing, by a FAU of the FPGA acceleration card, primary and/or secondary acceleration on the data to be accelerated.

Further, the step of migrating, by the FPGA acceleration card, the accelerated data specifically includes:

in response to data in a Memory on the FPGA acceleration card being accelerated by a FAU, implementing, by an iRDMA of the FPGA acceleration card, data migration between the Memory and FAU on the FPGA acceleration card, and in response to the accelerated data being migrated on a plurality of FPGA acceleration cards, implementing, by the iRDMA, data migration between Memories on the plurality of FPGA acceleration cards through MAC interfaces.

Further, an acceleration algorithm of the FAU includes LZ77 and Huffman. The LZ77 acceleration algorithm performs a first-stage compression on the data on the FPGA acceleration card to implement the primary data acceleration. The Huffman acceleration algorithm performs a second-stage compression on primarily accelerated data on the FPGA acceleration card to implement the secondary data acceleration.

Further, the iRDMA includes a bridge module Bridge, a message processing module pkt_pro, and a parsing module fau_parse. The message processing module pkt_pro parses and encapsulates a data migration read/write instruction message received by PCIE interface or the MAC interface. The parsing module fau_parse is configured to parse a data migration read instruction message initiated by the FAU. The bridge module Bridge is configured to convert migration instructions parsed by the bridge module Bridge and the message processing module pkt_pro into timing of reading/writing the Memory interface.

The effects provided in SUMMARY are not all effects of the present disclosure but only effects of the embodiments. One of the above technical solutions has the following advantages or beneficial effects.

According to the far-end data migration device and method based on a FPGA cloud platform in the present disclosure, data migration between a plurality of FPGA acceleration cards is completed by read/write instructions defined by the iRDMA on the FPGA acceleration cards, the FAUs, and the MAC interfaces. According to the present disclosure, a RoCE protocol is simplified, the present disclosure may be applied to a JBOF topology, the transmission efficiency is high, and the competitiveness of a cloud platform product of an enterprise is improved.

BRIEF DESCRIPTION OF THE DRAWINGS

In order to describe the technical solution in the embodiments of the present disclosure or the prior art more clearly, the drawings required to be used in descriptions about the embodiments or the prior art will be introduced briefly below. Apparently, those ordinarily skilled in the art may further obtain other drawings according to these drawings without creative work.

DETAILED DESCRIPTION

Figure 1:
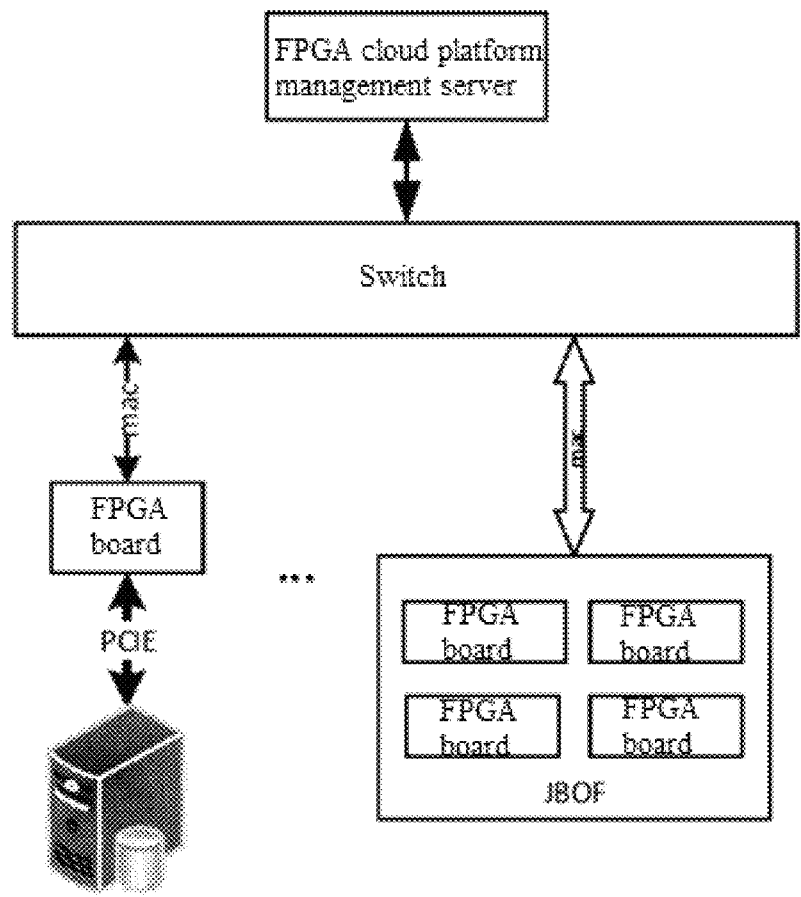
FIG. 1 is a schematic diagram of a network topology of an existing FPGA cloud platform according to the present disclosure.
Figure 2:
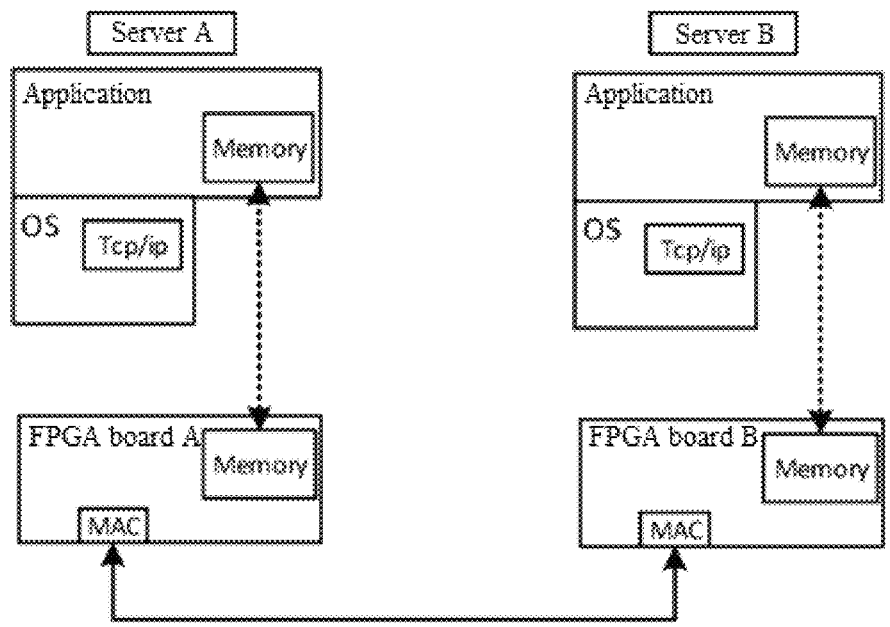
FIG. 2 is a schematic diagram of functions of an existing RDMA technology according to the present disclosure.

In order to describe the technical features of the present solution clearly, the present disclosure will be described below in detail with specific embodiments in combination with the drawings. The following disclosure provides many different embodiments or examples to implement different structures of the present disclosure. In order to simplify the present disclosure, components and settings in specific examples are described below. In addition, in the present disclosure, reference numerals and/or letters may be reused in different examples. Such reuse is for brevity and clarity and does not indicate a relationship between each embodiment and/or setting that is discussed. It is to be noted that the components shown in the drawings are not necessarily drawn to scale. Descriptions about known components and processing technologies and processes are omitted in the present disclosure so as to avoid unnecessary limitations on the present disclosure.

Figure 3:
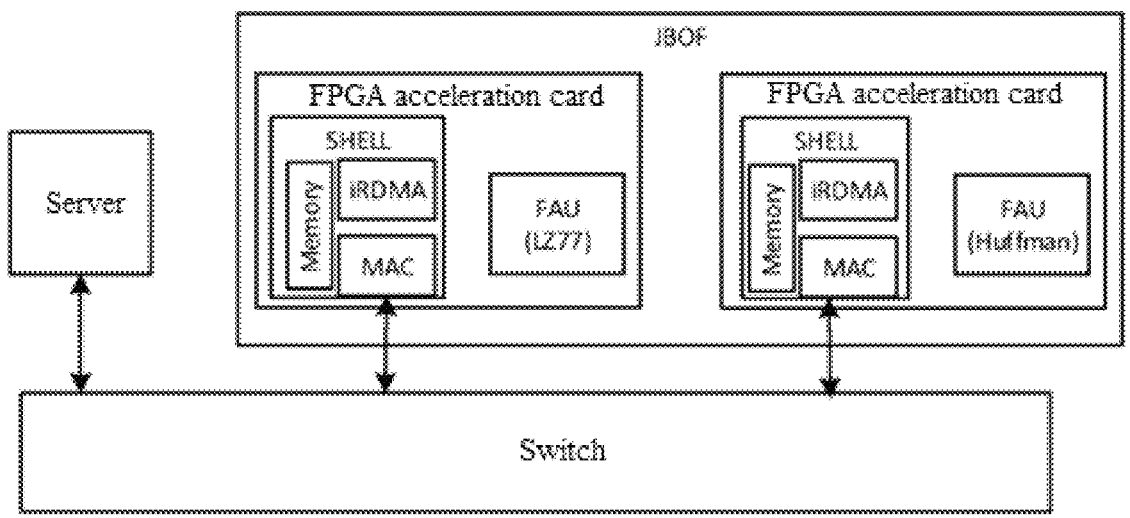
FIG. 3 is a structural block diagram of a device according to the present disclosure.

FIG. 3 is a structural block diagram of a device according to the present disclosure. The device includes a server, a switch, and a plurality of FPGA acceleration cards. The server transmits data to be accelerated to the FPGA acceleration card by means of the switch. The FPGA acceleration cards are configured to perform a primary and/or secondary acceleration on the data, and are configured to migrate the accelerated data.

The FPGA acceleration card includes a SHELL (the SHELL is a FPGA shell unit, a static part in a FPGA project that is unmodifiable by a user) and a FAU (an application acceleration module that is dynamically reconfigurable). The SHELL is configured to migrate data on the FPGA acceleration card. The FAU is configured to perform the primary and/or secondary acceleration on the data on the FPGA acceleration card.

The SHELL realizes an interface function of a FPGA, including a PCIE Direct Memory Access (DMA) interface, a MAC interface, a Memory interface, etc. The SHELL is a static part of the FPGA that is unmodifiable by a user. The FAU is an accelerator unit reconfigurable by the user. Different users may load different acceleration applications, and different boards may also load different applications. For example, a FAU of the board A may use a Convolutional Neural Network (CNN) acceleration algorithm, while a FAU of the board B uses a Deep Neural Network (DNN) acceleration algorithm, but static SHELL parts of the two boards are consistent.

The SHELL includes an iRDMA (customized RDMA in the present disclosure for a FPGA cloud platform), a Memory, PCIE, and MAC (in layer 2 in a network). The Memory is connected with the iRDMA. The iRDMA is connected with the PCIE and the MAC. When the server migrates the data to the FPGA acceleration card, the iRDMA implements data migration between a CPU Memory on the server and the Memory of the FPGA acceleration card. When the data in the Memory on the FPGA acceleration card is accelerated by the FAU, the iRDMA is configured to implement data migration between the Memory and FAU on the FPGA acceleration card. When the accelerated data is migrated on the plurality of FPGA acceleration cards, the iRDMA implements data migration between the Memories on the plurality of FPGA acceleration cards through the MAC interfaces.

An acceleration algorithm of the FAU includes LZ77 and Huffman. The LZ77 acceleration algorithm performs a first-stage compression on the data on the FPGA acceleration card to implement the primary data acceleration. The Huffman acceleration algorithm performs a second-stage compression on the primarily accelerated data on the FPGA acceleration card to implement the secondary data acceleration.

The acceleration algorithm combines two algorithms, i.e., a dictionary mode LZ77 algorithm and Huffman for redundancy statistics, thereby achieving a high compression rate. The Huffman algorithm depends on the LZ77 algorithm. The two algorithms may be used for acceleration of two FPGA acceleration cards respectively.

Figure 4:
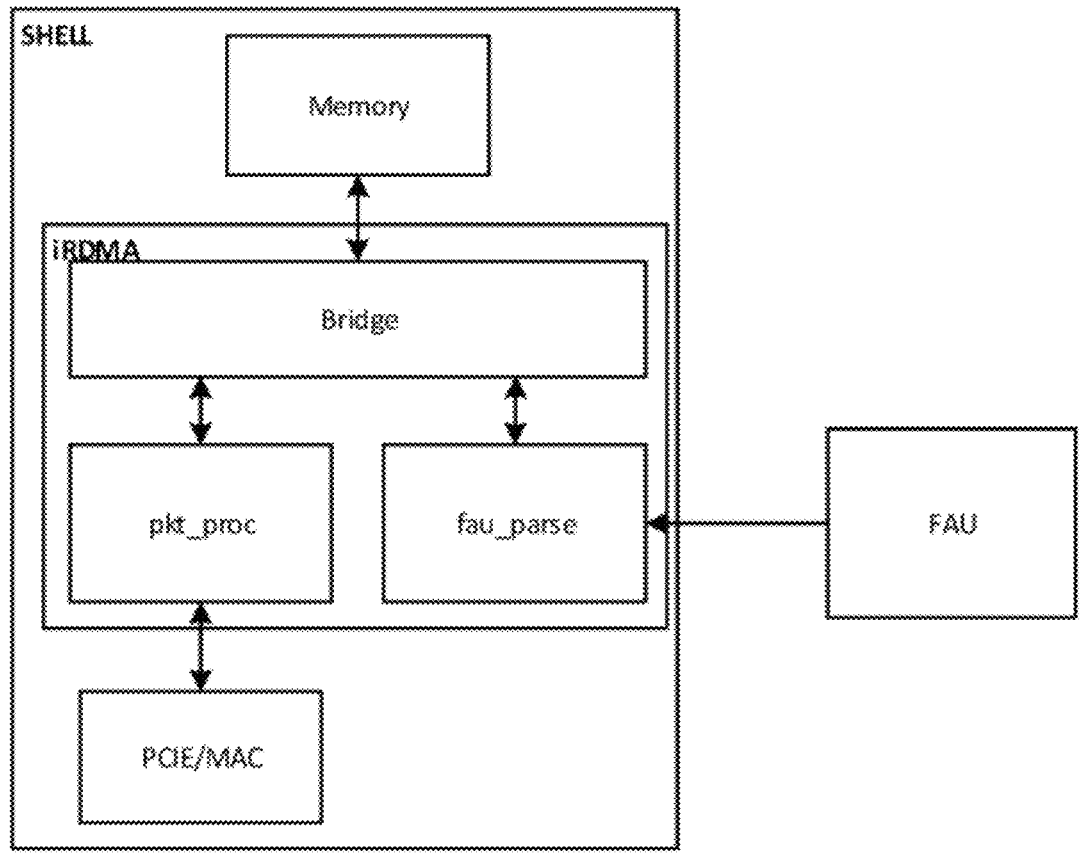
FIG. 4 is a module block diagram of an iRDMA according to an embodiment of the present disclosure.

FIG. 4 is a modular block diagram of iRDMA according to an embodiment of the present disclosure. The iRDMA includes a bridge module Bridge, a message processing module pkt_pro, and a parsing module fau_parse. The message processing module pkt_pro parses and encapsulates a data migration read/write instruction message received by the PCIE interface or the MAC interface. The parsing module fau_parse is configured to parse a data migration read instruction message initiated by the FAU. The bridge module Bridge is configured to convert migration instructions parsed by the bridge module Bridge and the message processing module pkt_pro into timing of reading/writing the Memory interface.

The message processing module pkt_proc receives an iRDMA read/write instruction message input from the PCIE interface or the MAC interface, and sends a read/write instruction obtained by a message parsing process to the bridge module Bridge. The bridge module Bridge converts the read/write instruction into timing of reading/writing the Memory interface to complete reading or writing the Memory.

In case of an iRDMA read instruction, the bridge module Bridge reads data from the Memory, and then sends the data to the message processing module pkt_proc. The message processing module pkt_proc completes a process such as message encapsulation, and then sends a message to the PCIE interface or the MAC interface.

The FAU completes a data acceleration process, and then initiates an iRDMA_rd instruction. The read instruction is sent to the bridge module Bridge after processing of the message processing module pkt_proc. The bridge module Bridge converts the read instruction into Memory read timing. The data read from the Memory is processed by the bridge module Bridge, and then is sent to the message processing module pkt_proc. The message processing module pkt_proc performs message encapsulation, and then sends a message to the PCIE interface or the MAC interface for output.

According to the method of the present disclosure, a customized method for completing data migration simply and efficiently under a FPGA cloud platform of a JBOF topology is provided, a FPGA parses a customized iRDMA read/write instruction message to complete data migration automatically, and a FAU may also trigger an instruction for data migration.

Figure 5:
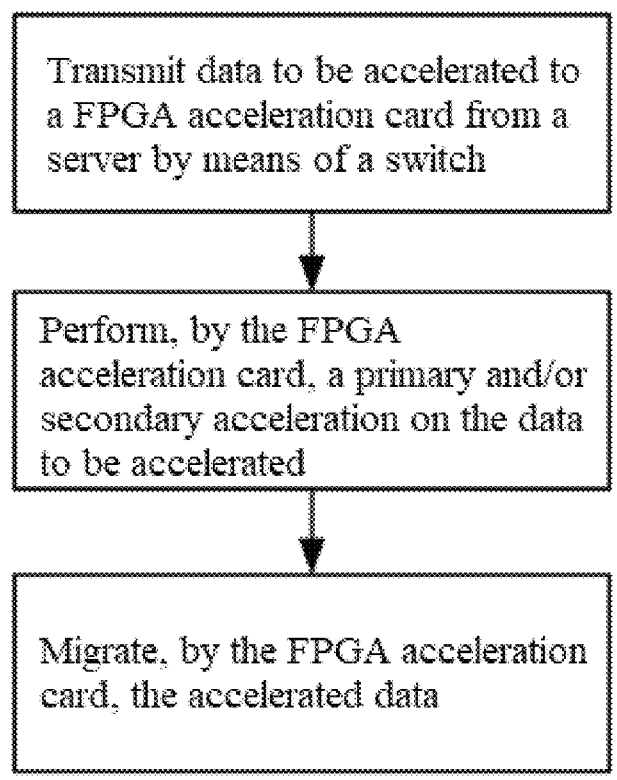
FIG. 5 is a flowchart of a method according to the present disclosure.

FIG. 5 is a flowchart of a method according to the present disclosure. The method includes the following steps:
  data to be accelerated is transmitted to a FPGA acceleration card from a server by means of a switch;
  the FPGA acceleration card performs the primary and/or secondary acceleration on the data to be accelerated; and
  the FPGA acceleration card migrates the accelerated data.

The step that data to be accelerated is transmitted to a FPGA acceleration card from a server by means of a switch specifically includes that: the data to be accelerated is transmitted to the switch from the server, and then is transmitted to a PCIE interface of the FPGA acceleration card from the switch.

The step that the FPGA acceleration card performs the primary and/or secondary acceleration on the data to be accelerated specifically includes that: a FAU of the FPGA acceleration card performs primary and/or secondary acceleration on the data to be accelerated.

The step that the FPGA acceleration card migrates the accelerated data specifically includes that:
  when data in a Memory on the FPGA acceleration card is accelerated by a FAU, iRDMA of the FPGA acceleration card implements data migration between the Memory and the FAU on the FPGA acceleration card, and when the accelerated data is migrated on a plurality of FPGA acceleration cards, the iRDMA implements data migration between the Memories on the plurality of FPGA acceleration cards through the MAC interfaces.

An acceleration algorithm of the FAU includes LZ77 and Huffman. The LZ77 acceleration algorithm performs the first-stage compression on the data on the FPGA acceleration card to implement the primary data acceleration. The Huffman acceleration algorithm performs the second-stage compression on the primarily accelerated data on the FPGA acceleration card to implement the secondary data acceleration.

The iRDMA includes a bridge module Bridge, a message processing module pkt_pro, and a parsing module fau_parse. The message processing module pkt_pro parses and encapsulates a data migration read/write instruction message received by a PCIE interface or the MAC interface. The parsing module fau_parse is configured to parse a data migration read instruction message initiated by the FAU. The bridge module Bridge is configured to convert migration instructions parsed by the bridge module Bridge and the message processing module pkt_pro into timing of reading/writing the Memory interface.

A detailed working process of the method of the present disclosure is as follows.

Data to be accelerated is transmitted to a PCIE interface of a first FPGA acceleration card from a server by means of a switch.

The first iRDMA of the first FPGA acceleration card receives a write instruction, and stores the data to be accelerated on the PCIE interface in a first Memory of the first FPGA acceleration card. The first iRDMA receives a read instruction, and reads the data to be accelerated from the first Memory to a first FAU of the first FPGA acceleration card. The first FAU performs first-stage acceleration on the data to be accelerated by means of the LZ77 acceleration algorithm to implement primary data acceleration.

The first FAU sends an iRDMA read instruction after completing the primary data acceleration. The first iRDMA of the first FPGA acceleration card receives the read instruction, and reads the primarily accelerated data from the first Memory. The first iRDMA of the first FPGA acceleration card encapsulates the primarily accelerated data into an iRDMA write instruction, and transmits the iRDMA write instruction to a second FPGA acceleration card through a first MAC interface of the first FPGA acceleration card.

The second FPGA acceleration card receives the iRDMA write instruction, and stores the primarily accelerated data in a second Memory of the second FPGA acceleration card. The second iRDMA of the second FPGA acceleration card receives a read instruction, and reads the primarily accelerated data from the second Memory to a second FAU of the second FPGA acceleration card. The second FAU performs the second-stage acceleration on the primarily accelerated data by means of the Huffman acceleration algorithm to implement the secondary data acceleration.

In the present disclosure, a customized iRDMA data migration method is provided for a JBOF network topology, thereby implementing data migration based on a FPGA cloud platform simply and efficiently. The iRDMA module uses 15K Look-Up-Table (LUT) resources (important FPGA resources) of a FPGA, occupying about 1% of LUT resources of a VU37P FPGA, while RoCE needs 40K LUT resources, occupying about 3% of the LUT resources of the VU37P FPGA (a FPGA with many Xilinx FPGA resources), thus iRDMA improves the data migration efficiency greatly.

Hereinbefore, it is only the preferred embodiment of the present disclosure. Those ordinarily skilled in the art may further make a plurality of improvements and embellishments without departing from the principle of the present disclosure, and these improvements and embellishments shall also be regarded as falling within the scope of protection of the present disclosure.

What is claimed is:

1. A far-end data migration device based on a Field Programmable Gate Array (FPGA) cloud platform, comprising a server, a switch, and a plurality of FPGA acceleration cards, wherein the server transmits data to be accelerated to the plurality of FPGA acceleration cards by means of the switch; and the plurality of FPGA acceleration cards are configured to perform at least one of a primary acceleration or a secondary acceleration on the data to yield accelerated data, and are configured to migrate the accelerated data;

wherein each of the plurality of FPGA acceleration cards comprises a SHELL and a FPGA Accelerator Unit (FAU), wherein the SHELL is configured as an interface connection between the FPGA acceleration card and the switch, and is configured to migrate the data on the FPGA acceleration card; and the FAU is configured to perform the at least one of the primary acceleration or the secondary acceleration on the data on the FPGA acceleration cart;

the SHELL comprises an iRDMA, a Memory, a Peripheral Component Interconnect Express (PCIE), and a Media Access Control (MAC), wherein the Memory is connected with the iRDMA; the iRDMA is connected with the PCIE and the MAC; in response to data in the Memory on the FPGA acceleration card being accelerated by the FAU, the iRDMA is configured to implement data migration between the Memory and the FAU on the FPGA acceleration card; and in response to the accelerated data being migrated on the plurality of FPGA acceleration cards, the iRDMA implements data migration between the Memories on the plurality of FPGA acceleration cards through MAC interfaces.

2. The far-end data migration device based on the FPGA cloud platform according to claim 1, wherein acceleration algorithms of the FAU comprise LZ77 and Huffman, wherein the LZ77 acceleration algorithm performs a first-stage compression on the data on the FPGA acceleration card to implement the primary acceleration to yield primarily accelerated data; and the Huffman acceleration algorithm performs a second-stage compression on the primarily accelerated data on the FPGA acceleration card to implement the secondary acceleration.

3. The far-end data migration device based on the FPGA cloud platform according to claim 2, wherein the Huffman acceleration algorithm depends on the LZ77 acceleration algorithm.

4. The far-end data migration device based on the FPGA cloud platform according to claim 1, wherein the iRDMA comprises a bridge module Bridge, a message processing module pkt_pro, and a parsing module fau_parse, wherein the message processing module pkt_pro parses and encapsulates a data migration read/write instruction message received by a PCIE interface or the MAC interface; the parsing module fau_parse is configured to parse a data migration read instruction message initiated by the FAU; and the bridge module Bridge is configured to convert migration instructions parsed by the bridge module Bridge and the message processing module pkt_pro into timing of reading/writing a Memory interface.

5. The far-end data migration device based on the FPGA cloud platform according to claim 4, wherein the message processing module pkt_pro receives an iRDMA read/write instruction message input from the PCIE interface or the MAC interface, and sends a read/write instruction obtained by a message parsing process to the bridge module Bridge.

6. The far-end data migration device based on the FPGA cloud platform according to claim 5, wherein under a circumstance of the iRDMA read/write instruction message being an iRDMA read instruction, the bridge module Bridge reads data from the Memory, and then sends the data to the message processing module pkt_pro.

7. The far-end data migration device based on the FPGA cloud platform according to claim 6, wherein the FAU completes a data acceleration process, and then initiates an iRDMA_rd instruction.

8. The far-end data migration device based on the FPGA cloud platform according to claim 1, wherein the far-end data migration device is provided for a Just a Bunch Of FPGAs (JBOF) network topology.

9. A far-end data migration method based on a Field Programmable Gate Array (FPGA) cloud platform, wherein the method comprises following steps:

transmitting data to be accelerated to a FPGA acceleration card from a server by means of a switch;

performing, by the FPGA acceleration card, at least one of a primary acceleration or a secondary acceleration on the data to be accelerated to yield accelerated data; and migrating, by the FPGA acceleration card, the accelerated data, wherein the step of migrating, by the FPGA acceleration card, the accelerated data comprises:

in response to data in a Memory on the FPGA acceleration card being accelerated by a FPGA Accelerator Unit (FAU), implementing, by an iRDMA of the FPGA acceleration card, data migration between the Memory and the FAU on the FPGA acceleration card, and in response to the accelerated data being migrated on a plurality of FPGA acceleration cards, implementing, by the iRDMA, data migration between Memories on the plurality of FPGA acceleration cards through Media Access Control (MAC) interfaces.

10. The far-end data migration method based on the FPGA cloud platform according to claim 9, wherein the step of performing, by the FPGA acceleration card, the at least one of the primary acceleration or the secondary acceleration on the data to be accelerated comprises:

performing, by the FAU of the FPGA acceleration card, the at least one of the primary acceleration or the secondary acceleration on the data to be accelerated.

11. The far-end data migration method based on the FPGA cloud platform according to claim 10, wherein acceleration algorithms of the FAU comprise LZ77 and Huffman, wherein the LZ77 acceleration algorithm performs a first-stage compression on the data on the FPGA acceleration card to implement the primary acceleration to yield primarily accelerated data; and the Huffman acceleration algorithm performs a second-stage compression on the primarily accelerated data on the FPGA acceleration card to implement the secondary acceleration.

12. The far-end data migration method based on the FPGA cloud platform according to claim 11, wherein the Huffman acceleration algorithm depends on the LZ77 acceleration algorithm.

13. The far-end data migration method based on the FPGA cloud platform according to claim 11, wherein the far-end data migration method is provided for a Just a Bunch Of FPGAs (JBOF) network topology.

14. The far-end data migration method based on the FPGA cloud platform according to claim 9, wherein the iRDMA comprises a bridge module Bridge, a message processing module pkt_pro, and a parsing module fau_parse, wherein the message processing module pkt_pro parses and encapsulates a data migration read/write instruction message received by a Peripheral Component Interconnect Express (PCIE) interface or MAC interface of the FPGA acceleration card; the parsing module fau_parse is configured to parse a data migration read instruction message initiated by the FAU; and the bridge module Bridge is configured to convert migration instructions parsed by the bridge module Bridge and the message processing module pkt_pro into timing of reading/writing a Memory interface.

15. The far-end data migration method based on the FPGA cloud platform according to claim 14, wherein the message processing module pkt_pro receives an iRDMA read/write instruction message input from the PCIE interface or the MAC interface, and sends a read/write instruction obtained by a message parsing process to the bridge module Bridge.

16. The far-end data migration method based on the FPGA cloud platform according to claim 15, wherein under a circumstance of the iRDMA read/write instruction message being an iRDMA read instruction, the bridge module Bridge reads data from the Memory, and then sends the data to the message processing module pkt_pro.

17. The far-end data migration method based on the FPGA cloud platform according to claim 16, wherein the FAU completes a data acceleration process, and then initiates an iRDMA_rd instruction.

\* \* \* \* \*